United States Patent
Sabel et al.

[11] Patent Number: 5,105,676
[45] Date of Patent: Apr. 21, 1992

[54] TRANSPORTATION AND ADJUSTMENT PROTECTION FOR MANUAL TRANSMISSION GEAR SHIFT LEVER

[75] Inventors: Gustav Sabel; Wolfgang Winter-Peter, both of Cologne, Fed. Rep. of Germany

[73] Assignee: Ford Motor Company, Dearborn, Mich.

[21] Appl. No.: 711,842

[22] Filed: Jun. 7, 1991

[30] Foreign Application Priority Data

Sep. 20, 1990 [DE] Fed. Rep. of Germany ....... 4029789

[51] Int. Cl.⁵ .......................................... F16H 57/06
[52] U.S. Cl. .................................. 74/475; 74/473 P; 70/247; 180/287
[58] Field of Search ............. 74/474 P, 475; 180/287; 70/247, 254

[56] References Cited

FOREIGN PATENT DOCUMENTS 2700976  7/1978  Fed. Rep. of Germany ........ 70/247
2152454  8/1985  United Kingdom ................. 70/247

Primary Examiner—Leslie A. Braun
Assistant Examiner—Ryan W. Massey
Attorney, Agent, or Firm—Frank G. McKenzie; Roger L. May

[57] ABSTRACT

A device for holding the position of the gear shift lever of a manual transmission includes a first packing member located on the dome of the mounting for the gear shift lever and having a radial slot located between resilient holding tongues. A second packing member, engaged with the first packing, includes a radial slot brought into and out of alignment with the slot of the first packing member by rotation through a predetermined angular range.

15 Claims, 2 Drawing Sheets

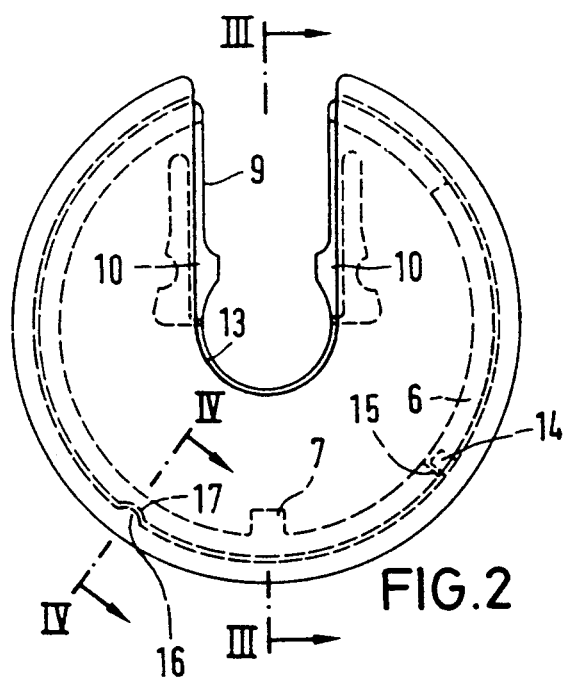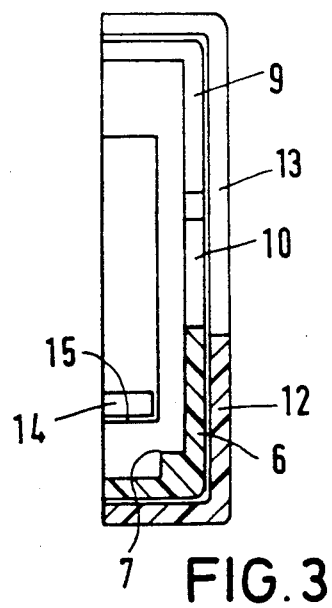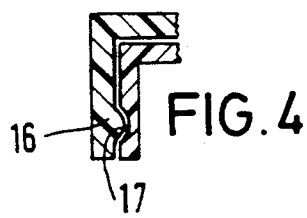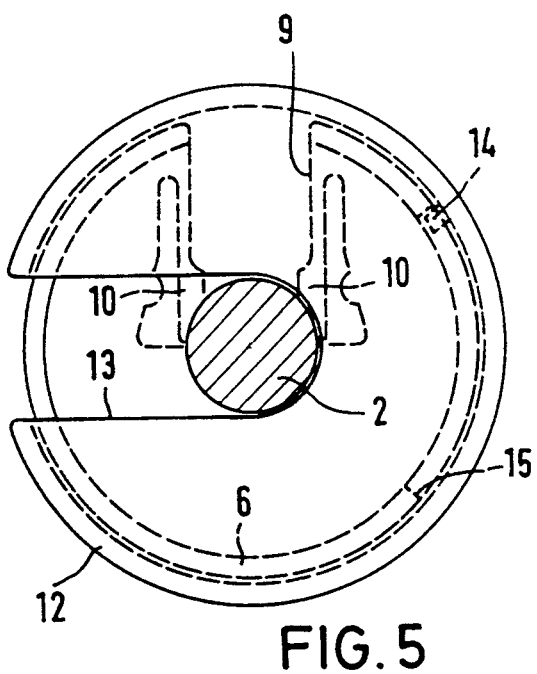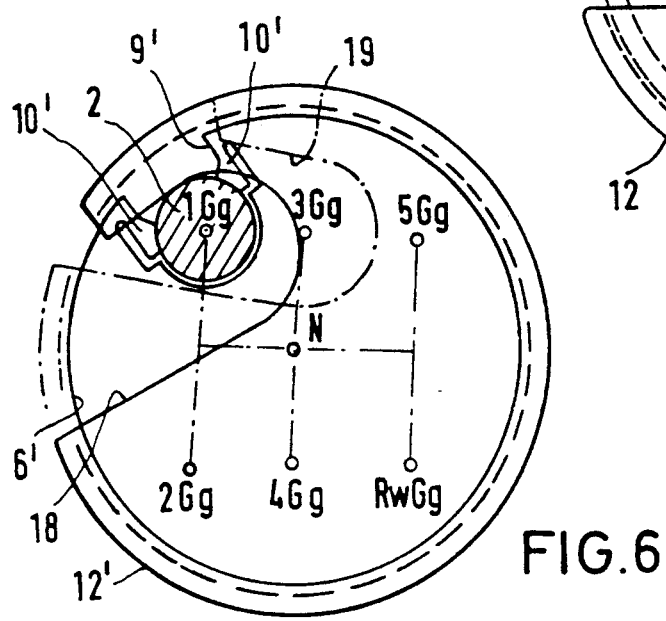

TRANSPORTATION AND ADJUSTMENT PROTECTION FOR MANUAL TRANSMISSION GEAR SHIFT LEVER

BACKGROUND OF THE INVENTION

1. Field of the Invention

This invention pertains to the field of manual transmission gear shift mechanisms, particularly to devices for holding a gear shift lever against inadvertent movement such as may occur during transport or installation in a motor vehicle.

2. Description of the Prior Art

A device for preventing theft of a motor vehicle is described in German Offenlegungsschrift 2700976. The device includes packing adjacent the gear shift lever mounting, brought by rotation of the lever to an arresting position where further movement of the lever is prevented.

The packing acts through bolts on arresting levers, pivotably supported on the gear shift mounting, urging the arresting lever to a position where they positively engage and hold the gear shift lever. In this position, the packing must be secured in its rotated location by a closure cylinder.

That anti-theft device is relatively complicated, expensive to produce and difficult to assemble. Consequently, it cannot be used as a transportation and adjustment protector, which must be simple to apply and to remove during motor vehicle assembly and installation.

It is conventional practice to secure the gear shift lever of a manual transmission in a specific position using a transportation and adjustment protector device so that perfect coordination is guaranteed when producing a connection joining the portion of the gear shift mechanism that is external to the transmission housing and the internal gear shift portion of the mechanism. The transmission and adjustment protector is currently constructed in the form of a simple snap-on cap packing member, which fixes the gear shift lever in its neutral position in a radial slot through resilient holding tongues.

Due to jarring and rough transport to the assembly site and during installation, the gear shift lever may be moved repetitively, but unintentionally, from its intended position due to impact and inability of resilient holding tongues to locate positively the shift lever and to hold the intended position.

SUMMARY OF THE INVENTION

An object of the invention, therefore, is to provide an improved transportation and adjustment protecting device for the gear shift lever of a manual transmission of the type used in automotive vehicles. The lever is positively fixed simply in a predetermined position by a device that can be applied or removed easily and constructed at low cost.

A first packing member is engaged by a second packing member, which is rotated through about 90° relative to the first packing member. These are placed in an engageable manner on the dome of the gear shift mount to secure the gear shift lever in a predetermined position in a radial slot between resilient holding tongues. In this way, the gear shift lever is in this way secured positively in a predetermined position so that inadvertent escape of the gear shift lever from the predetermined position during transport or assembly or while the mechanism is being adjusted is prevented.

Because a projection, which meshes in a recess in a first packing member, is provided on the second packing member, the angle of rotation of the mechanism is fixed.

The two packing members are engaged mutually and fixed in their respective end locations due to the presence and operation of suitable catch knobs and catch cavities carried on the packing members.

The gear shift lever is fixed in a different predetermined position, one more desirable for the adjustment of the gear shift mechanism such as in the first gear position, due to the presence of a radial slot, resilient holding tongues on the first packing member, a slot of a different shape than that of the first number, and an arresting face on the second packing member.

BRIEF DESCRIPTION OF THE DRAWINGS

The invention is described in more detail with reference to embodiments illustrated in the accompanying drawings.

FIG. 2 is a plan view of the transportation and adjustment protecting device in a position where two packing members are mutually engaged for installation on the gear shift lever mounting.

FIG. 3 is a vertical cross section taken at plane III—III in FIG. 2.

FIG. 4 is a cross section taken at plane IV—IV in FIG. 2.

FIG. 5 is a plan view of the two packing members located in their positive arresting positions.

FIG. 6 is a plan view of a second embodiment of the invention.

DESCRIPTION OF THE PREFERRED EMBODIMENT

Figure 1:
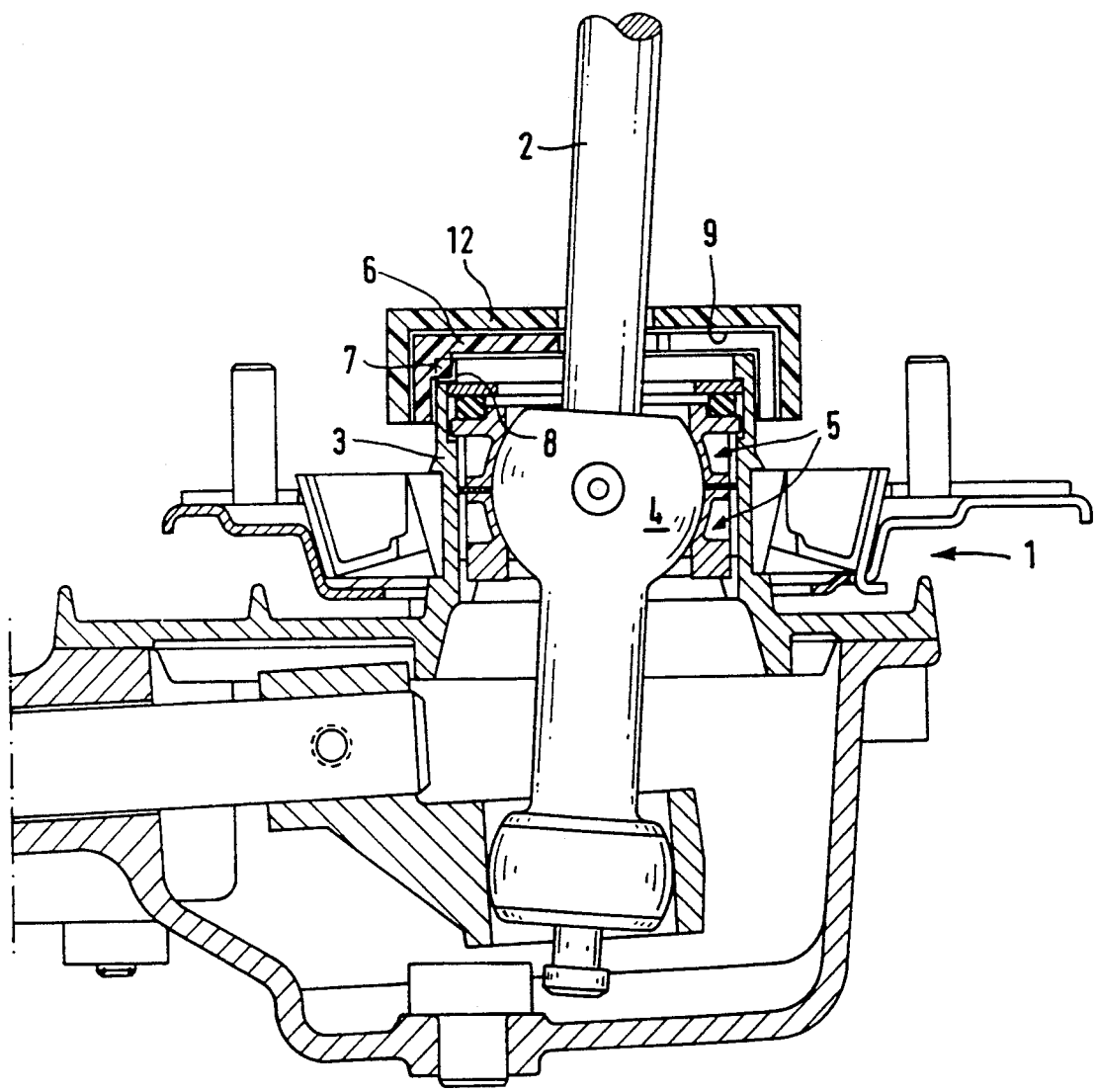
FIG. 1 is a vertical cross section through the pivotal mounting that supports the gear shift lever of a manual transmission, having the transport and adjustment device of this invention applied.

FIG. 1 shows a pivotal mounting 1 for the gear shift lever 2 of a manual transmission. The mounting has a dome 3, in which an articulating ball 4 of the gear shift lever 2 is supported pivotally in a spherically concave support 5.

A cap-type packing member 6 is Placed over dome 3, the connection between the dome and packing member being made by engagement of a nose 7 located on packing member 6 in a recess 8 located on the dome. The packing member has a radial slot 9 which is bounded toward the center of the packing member by two resilient holding tongues 10.

Packing member 6 is initially located on lever 2 by sliding radially until lever 2 passes the restriction on the inner surface of holding tongues 10 and the lever becomes seated within the partial circular surface at the end of the holding tongues. Then, packing member 6 is pressed downward unto dome 3 where it is secured against rotation by engagement of nose 7 in the recess 8. Although the holding tongue holds lever 2 in a predetermined position, the lever is susceptible to movement out of the predetermined position when a force is applied to the gear shift lever during transportation or the process of assembly or installation in the motor vehicle. If this inadvertent displacement of the gear shift lever were unnoticed, it could lead to faulty assembly while making the connection of the external gear shift rod to the internal gear shift rod. If this connection were made incorrectly, it could result in a malfunction.

As shown in FIGS. 2-5, an additional packing member 12, also having a radial slot 13, is positioned over the outer surface of packing member 6. The second packing member 12 is radially rotatable through approximately 90° relative to the first packing member 6.

The angle of rotation between the two packing members 6, 12 is limited by an inwardly projecting cog 14 on the second packing member 12 and a recess 15 on the first packing member 6 extending angularly about the central axis of the packing members 6, 12 and dome 3. The radial ends of recess 15 limit the angular travel of member 12 relative to member 6.

The inner surface of packing member 12 is formed with a radially directed bead and the outer surface of packing member 6 includes a complimentary recess 17 so that, when the bead is located in the recess, the two packing members are engaged to form a unit. Engagement of bead 16 in recess 17 holds the angular position of packing member 12 at one extremity of its angular travel, at the position where slots 9, 13 are aligned angularly. The circumferential faces and the bases of the packing members may be contiguous or adjacent faces.

Because of the presence of the second packing member 12, complete positive fixing of the gear shift lever in a predetermined position, the position required for transport, assembly or adjustment, is made and held by rotation of number 12 to the position of FIG. 5, about 90° counterclockwise from the position of FIG. 1.

As shown in FIG. 6, the device can be constructed such that lever 2 is positively fixed in a different position from that of the device shown in FIGS. 1-5. The different Position may be more desirable for the gear shift adjustment, e.g., in the position for the first gear ratio, located in the conventional position in a double-H shift pattern indicated in dot-dash lines in FIG. 6.

In the embodiment of FIG. 6, it is merely necessary to provide a suitable modified radial slot 9' with resilient holding tongues 10' in one packing member 6' and a different slot shape 18 having an arresting surface 19 on the other packing member 12'. The two packing members 6', 12' engage and rotate identically as described with reference to the device shown in FIGS. 1-5.

Having described the preferred embodiment of our invention, what we claim and desire to secure by U.S. Letters Patent is:

1. A device for releasably holding a gear shift lever of an automotive transmission against movement about a pivot, comprising:
   a first packing member supported against rotation about an axis, having a first slot extending from the axis to the periphery of said first member and directed transverse to the gear shift lever;
   a second packing member, mounted concentric with the first packing member for rotation about said axis, having a second slot extending from the axis to the periphery of said second member and directed transverse to the gear shift lever, the lever extending through said first slot and second slot; and
   means supported on a packing member for resiliently engaging the lever.

2. The device of claim 1 wherein the first slot and second slot together define openings aligned with said axis regardless of the angular relation of the second packing member relative to the first packing member, said openings being able to receive the gear shift lever therein.

3. The device of claim 1 wherein the first packing member further comprises a recess located on a surface facing the second packing member, extending angularly about the axis and having stop surfaces at its angular extremities; and
   the second packing member further comprises a projection extending inwardly from its periphery into the recess, adapted to contact said stop surfaces, thereby limiting the range of rotation of the second packing member relative to the first packing member.

4. The device of claim 1 wherein the first packing member further comprises a second recess located on a surface facing the second packing member; and
   the second packing member further comprises a bead extending inwardly into the second recess, said bead adapted to engage the second recess, thereby holding the first and second packing members together.

5. The device of claim 3 wherein the first packing member further comprises a second recess located on a surface facing the second packing member; and
   the second packing member further comprises a bead extending inwardly into the second recess, said bead adapted to engage the second recess, the angular location of the second recess and bead being such that when the bead engages the second recess the projection is substantially contacting a stop surface, whereby the first and second packing members are held in position at an extremity of the angular range of motion of the second packing member.

6. A device for releasably holding a gear shift lever of an automotive transmission against movement about a pivot, comprising:
   a gear shift lever;
   means pivotably supporting the gear shift lever;
   a first packing member supported on the supporting means against rotation about an axis, having a first slot extending from the axis to the periphery of said first member and directed transverse to the gear shift lever;
   a second packing member, mounted concentric with the first packing member for rotation about said axis, having a second slot extending from the axis to the periphery of said second member and directed transverse to the gear shift lever, the lever extending through said first slot and second slot; and
   means supported on a packing member for resilient engaging the lever.

7. The device of claim 6 wherein the first slot and second slot together define openings aligned with said axis regardless of the angular relation of the second packing member relative to the first packing member, said openings being able to receive the gear shift lever therein.

8. The device of claim 6 wherein the first packing member further comprises a recess located on a surface facing the second packing member, extending angularly about the axis and having stop surfaces at its angular extremities; and
   the second packing member further comprises a projection extending inwardly from its periphery into the recess, adapted to contact said stop surfaces, thereby limiting the range of rotation of the second packing member relative to the first packing member.

9. The device of claim 6 wherein the first packing member further comprises a second recess located on a surface facing the second packing member; and the second packing member further comprises a bead extending inwardly into the second recess, said bead adapted to engage the second recess, thereby holding the first and second packing members together.

10. The device of claim 8 wherein the first packing member further comprises a second recess located on a surface facing the second packing member; and the second packing member further comprises a bead extending inwardly into the second recess, said bead adapted to engage the second recess, the angular location of the second recess and bead being such that when the bead engages the second recess the projection is substantially contacting a stop surface, whereby the first and second packing members are held in position at an extremity of the angular range of motion of the second packing member.

11. A device for releasably holding a gear shift lever of an automotive transmission against movement about a pivot, comprising:

a gear shift lever moveable among multiple forward drive positions and a reverse drive position, said positions being mutually spaced in a double-H arrangement;

means pivotably supporting the gear shift lever for movement among said positions;

a first packing member supported on the supporting means against rotation about an axis, having a first slot extending from a shift lever drive position the periphery of said first member and directed transverse to the gear shift lever;

a second packing member, mounted concentric with the first packing member for rotation about said axis, having a planar surface substantially transverse to the shift lever and a second slot formed in said planar surface, extending from the periphery of said second member partially across the planar surface, said second slot having a lateral surface contacting the shift lever, the lever extending through said first slot and second slot; and means supported on a packing member for resilient engaging the lever.

12. The device of claim 11 wherein the first slot and second slot together define openings aligned with said axis regardless of the angular relation of the second packing member relative to the first packing member, said openings being able to receive the gear shift lever therein.

13. The device of claim 11 wherein the first packing member further comprises a recess located on a surface facing the second packing member, extending angularly about the axis and having stop surfaces at its angular extremities; and the second packing member further comprises a projection extending inwardly from its periphery into the recess, adapted to contact said stop surfaces, thereby limiting the range of rotation of the second packing member relative to the first packing member.

14. The device of claim 11 wherein the first packing member further comprises a second recess located on a surface facing the second packing member; and the second packing member further comprises a bead extending inwardly into the second recess, said bead adapted to engage the second recess, thereby holding the first and second packing members together.

15. The device of claim 13 wherein the first packing member further comprises a second recess located on a surface facing the second packing member; and the second packing member further comprises a bead extending inwardly into the second recess, said bead adapted to engage the second recess, the angular location of the second recess and bead being such that when the bead engages the second recess the projection is substantially contacting a stop surface, whereby the first and second packing members are held in position at an extremity of the angular range of motion of the second packing member.

* * * * *